May 16, 1939.　　　P. W. OLSON　　　2,158,761
KEY CUTTING MACHINE
Filed March 25, 1937　　　7 Sheets-Sheet 3

INVENTOR:
PHILLIP W. OLSON
BY Kent W. Wonnell
ATTORNEY.

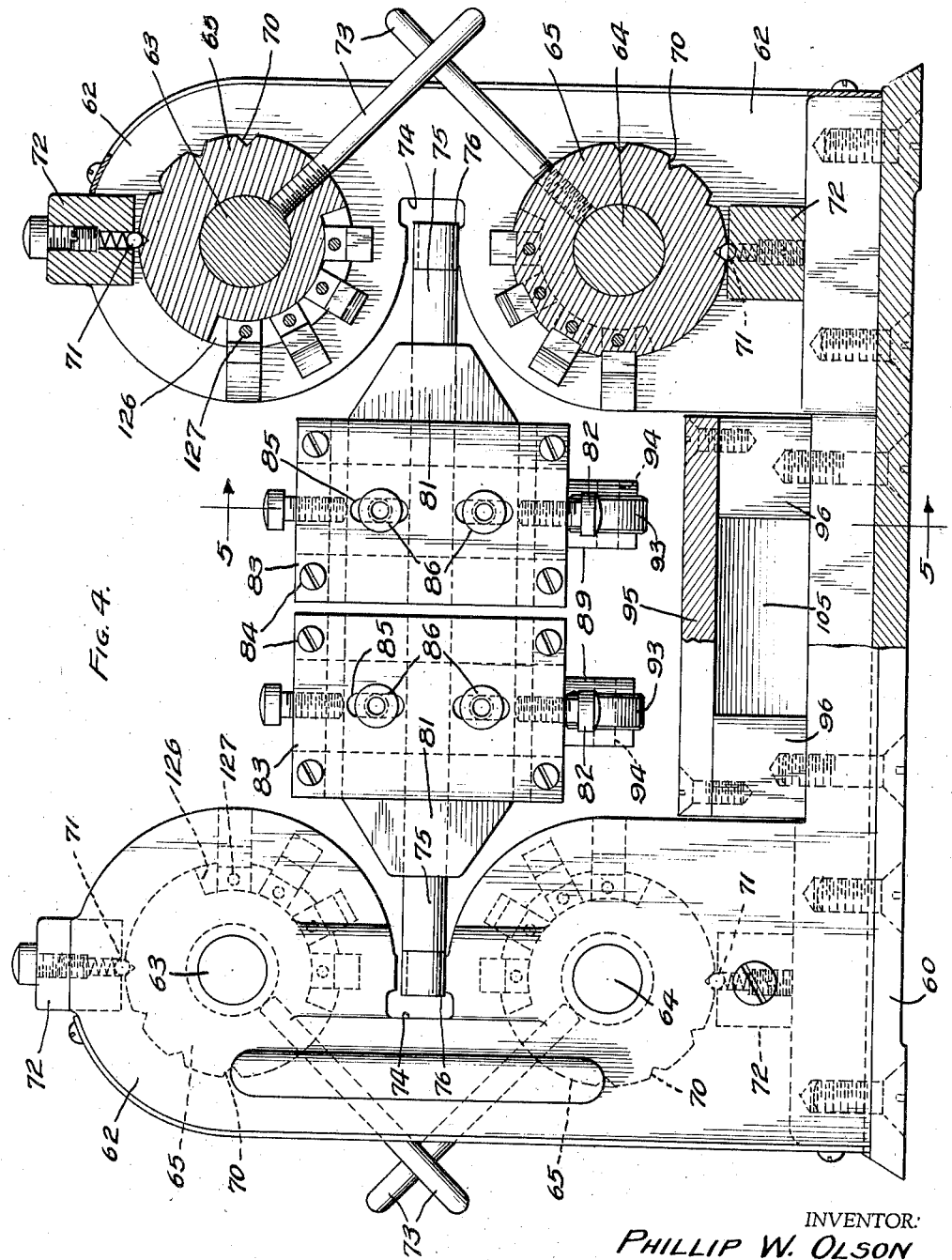

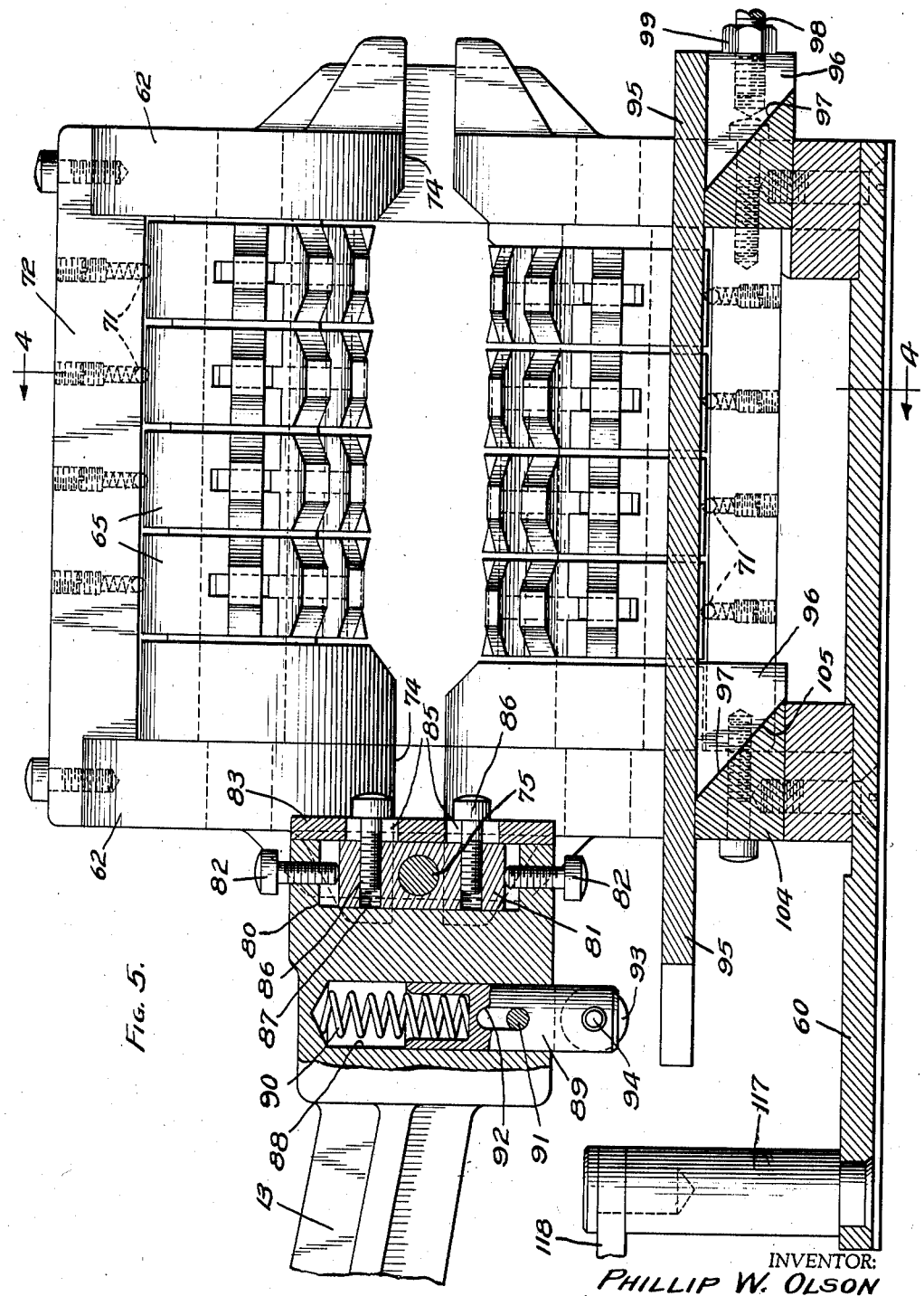

May 16, 1939.　　P. W. OLSON　　2,158,761
KEY CUTTING MACHINE
Filed March 25, 1937　　7 Sheets-Sheet 6
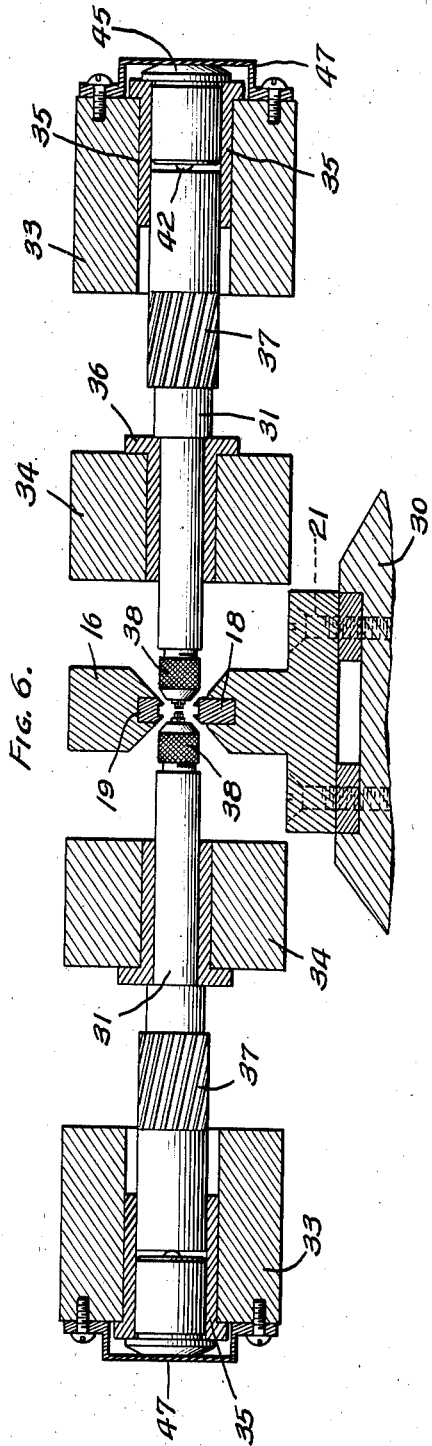
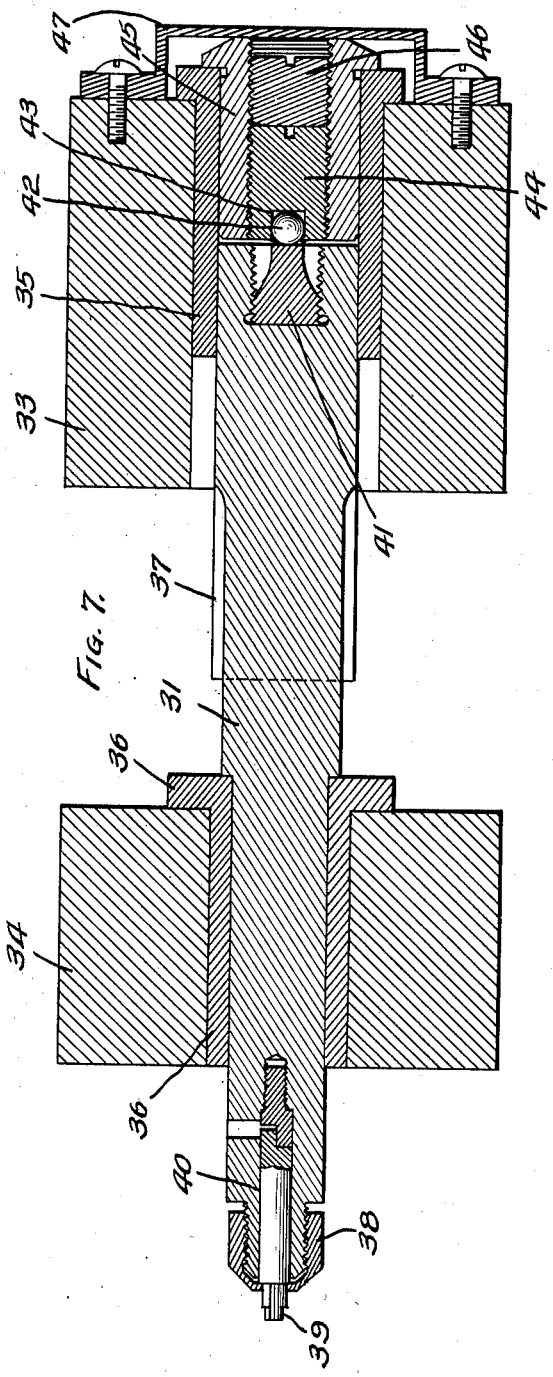
INVENTOR:
PHILLIP W. OLSON
BY
ATTORNEY.

May 16, 1939.  P. W. OLSON  2,158,761
KEY CUTTING MACHINE
Filed March 25, 1937  7 Sheets-Sheet 7
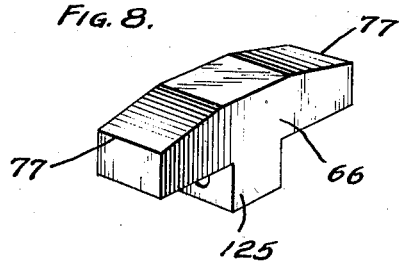
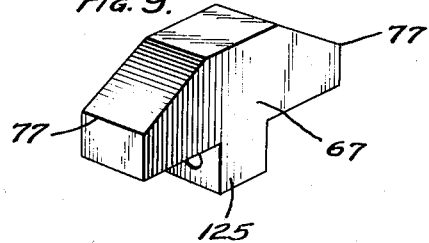
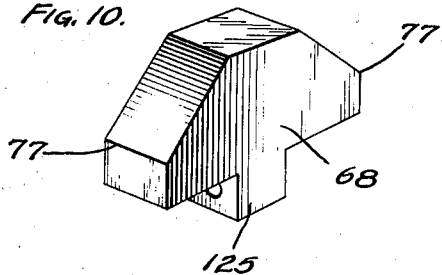
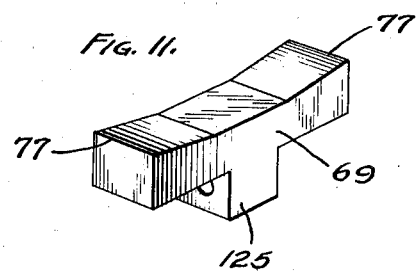
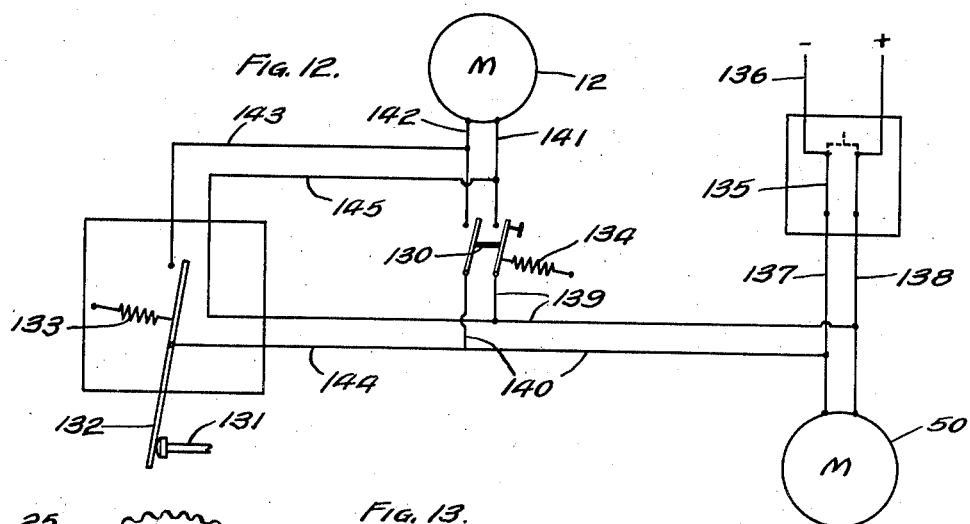
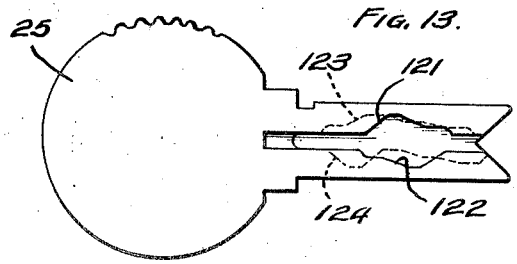
INVENTOR:
PHILLIP W. OLSON
BY
ATTORNEY.

Patented May 16, 1939

2,158,761

UNITED STATES PATENT OFFICE 2,158,761

KEY CUTTING MACHINE

Phillip W. Olson, Grand Rapids, Mich., assignor to Automatic Instrument Company, a corporation of Michigan Application March 25, 1937, Serial No. 132,936

38 Claims. (Cl. 90—13.05)

This invention relates in general to a machine for cutting grooves or shoulders at the sides and edges of key blanks for making keys for tumbler locks.

An important object of the invention is in the provision of a machine or apparatus of this kind which provides for the making of a great variety of keys in a series or a variety of series in which no two keys are the same.

A further object of the invention is in the provision of means for cutting grooves or shoulders in opposite sides of a key blank at the same time.

A still further object of the invention is in the provision of an apparatus for cutting individual unrelated grooves or shoulders on both sides of a key blank by the relative movement of a cutter in opposite directions.

A still further object of the invention is in the provision of means for the automatic or manual variation of the key cutting means.

Other objects of the invention such as improvement of the key follower, improvement of the varying means, improvement of the cutter operating means, improvement of the key holding means, and various other details of construction will be pointed out in the specification, and will be apparent from the accompanying drawings, in which, Fig. 1 is a side elevation illustrating a machine in accordance with the present invention;

Fig. 4 is an end view of the cam holder as shown in the side elevation in Fig. 3;

Fig. 5 is a section taken on the line 5—5 of Fig. 4;

Fig. 6 shows the transverse mounting of the cutter spindles;

Fig. 7 is a sectional view of one of the spindles;

Figs. 8, 9, 10 and 11 are perspective views of four different cams used in the cam holders;

Fig. 12 is a diagrammatic representation of the electrical operating circuits for the machine; and Fig. 13 illustrates a key of the type cut by this machine having four different unrelated cam operating surfaces, two on each side.

Figure 1:
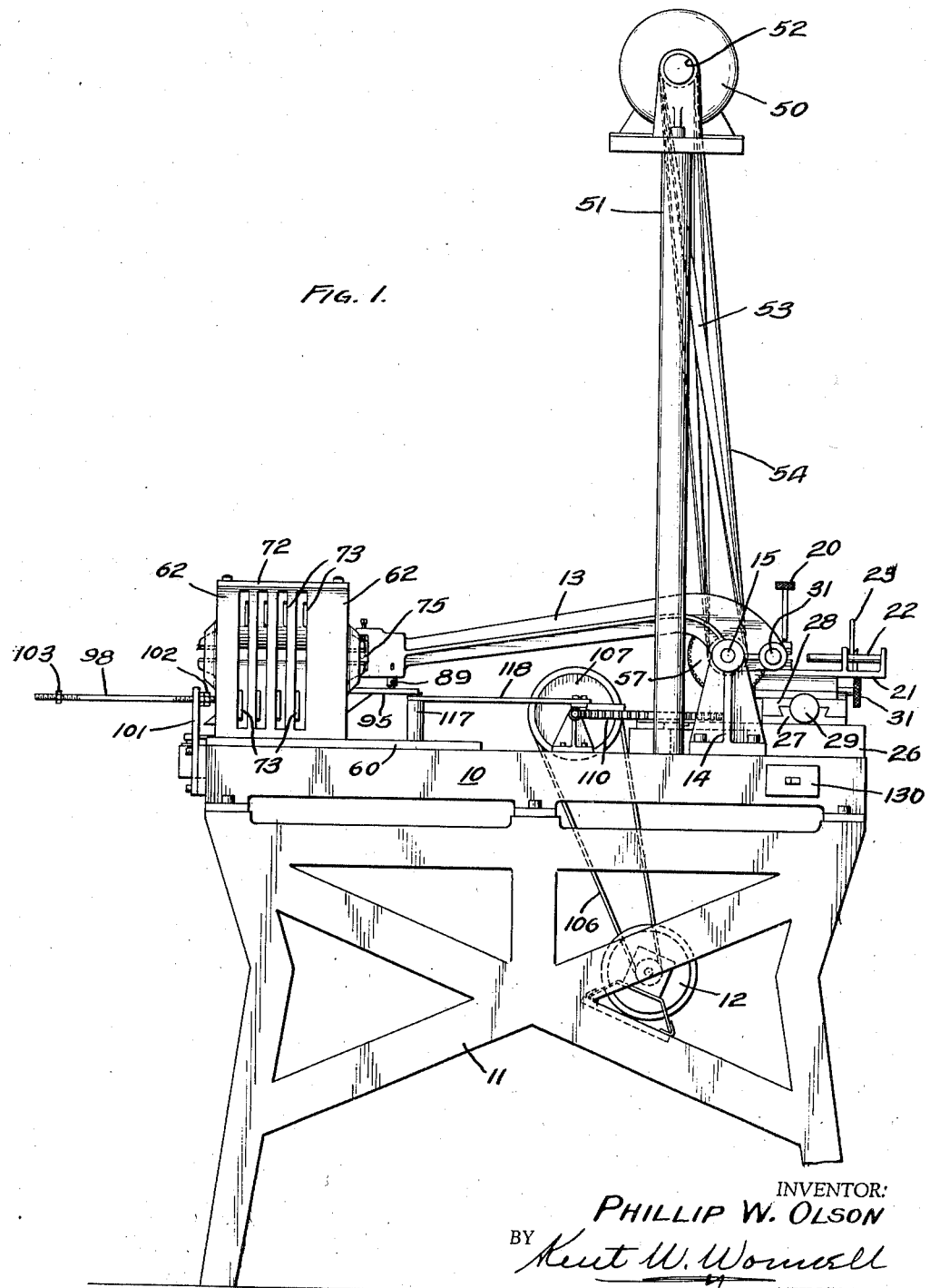

This invention relates to a key cutting machine for rapidly and accurately cutting a variety of unrelated tumbler operating grooves in the opposite sides and edges of a flat key blank either of the type shown in Fig. 13 or of a type in which the cam operating grooves are at the upper and lower edges of the key, leaving a central web at the center and a ridge at each side having unrelated cam operating shoulders. An important advantage of this machine is that by having a variety of cams easily moved from one definite position to another, a great variety of keys can be rapidly and accurately cut without duplication and any individual key may be easily and quickly reproduced if its number or combination pattern is recorded or known.

Referring now more particularly to the drawings, a machine base 10 is suitably supported as by a frame 11 which also supports a driving motor 12. At one end of the base is a key supporting head; at the other end of the base is a cam supporting head between which are a pair of cutter operating beams 13 mounted in bearings 14 at the sides of the base near the key holding head and upon a shaft 15 mounted in the bearings.

In the key holding head is a holding block 16 having a recess 17 for receiving a key blank in horizontal position with its web disposed vertically in engagement with lower and upper contact plates 18 and 19 pressed against the edges of the key by an adjusting screw 20. In an extension 21 of the block 16 is mounted a longitudinally movable end clamping bar 22 having an extending arm or handle 23 for rotating the bar 22 and also for engaging a cam 24 at one side of the bar so that when the handle engages the cam the end of the bar 22 is moved against the end of a key blank 25 located in the holder. For keys of different lengths the bar is varied so that the movement of the handle 23 quickly locks or unlocks a key endwise from the holding block.

To adjust the key holding block laterally and transversely a slide block 26 is secured to the base 10 and has a plate 27 movable reciprocably on the base plate with a slide plate 28 movable crosswise thereof and adjustable by means of a hand screw 29 at one side of the head. Movable longitudinally in the cross slide 28 is a longitudinal slide plate 30 having an adjusting screw 31 for moving it at right angles with respect to the cross plate 28. The upper slide plate 30 is connected to the block 16 so that the adjustment of the plates 28 and 30 causes a corresponding movement of the key holding block and the reciprocation of the slide block 27 causes the movement of the entire key holding head mounted thereon.

At each side of the key holding head is a cutter spindle 32 carried by bifurcated extremities 33 and 34 of one of the beams 13 which project beyond the mounting shaft 15 therefor. These extremities have bearings 35 and 36 in which the spindle is mounted and between the extremities is a gear 37 by which the spindle is rotated. At the cutting end of the spindle is a threaded attachment head 38 for securing a drill or bit 39 in an end opening 40, in a well known manner. At the other end of each spindle is a thrust bearing comprising a thrust plate 41 mounted in the end of the spindle and a ball bearing 42 engaging the bearing 41 and seated in an opening 43 of a bearing member 44 mounted in a bearing block 45 inserted at the end of the bearing 35 and having an additional attachment screw 46 in the outer end of the same ball, the bearing block 45 being secured to the outside of the beam extremity 33 by a clamping plate 47.

In order to drive the spindles 31 a cutter motor 50 is mounted above the base 10 from which it is supported by standards 51 at each side. At the ends of this motor are pulleys 52 connected by belts 53 and 54 with pulleys 55 and 56 respectively mounted on the shaft 15 between the bifurcated extremities of each of the beams 13, and therefore on opposite sides of the key head. Each of the pulleys 55 and 56 is directly connected to a gear 57 also mounted on the shaft 15 and meshing with one of the gear pinions 37 on the corresponding driving spindle 31. One of the belts 53 or 54 is crossed in its connection to the corresponding pulley so that the spindles 31 on opposite sides of the key head will be driven in opposite directions to rotate the bits or cutters 39.

The cam supporting head is mounted for reciprocating movement longitudinally of the base 10 upon a plate 60 positioned between guide bars 61 at the sides thereof. At each side of the plate and spaced apart from each other and from those at the opposite side, are end supports 62 for upper and lower cam shafts 63 and 64. Mounted upon these shafts are a series of cam holders 65, each holder carrying one or more varieties of a series of cams 66, 67, 68 and 69 in any desired assortment or variation. Some holders may have all of one kind or any variety of all kinds. In the present exemplification four cam holders are shown on each shaft and four cams are held by each holder.

Each cam holder has a plurality of notches 70 corresponding to the cams attached thereto, and each cam holder is retained in any adjusted position by a spring pressed ball detent 71 mounted in a cross bar 72 above or below the cam holders.

A handle 73 extends from each cam holder to the outer side of the supports 62 and these handles are positioned for manual or automatic adjustment, to vary the location or arrangement of the cam holders, in varying the positions of the different cams.

The upper and lower cams at each side of the cam head are spaced apart and the end supports 62 at their inner edges are formed with slots or recesses 74 so that a cam follower 75 attached at the adjacent end of each beam 13 is free to move therethrough and in contact with the various cams supported by the upper and lower series of cam holders. Thus a variety of movements is imparted to the cam follower and to the beam to which it is attached, the movement of each beam may be entirely different at each side and for the upper and lower cam engagement thereof. The rest slots 74 at the ends of the cam supporting head provided a common start and finish for the follower path which is unchanged by the cams.

Followers 75 may be provided with contact rollers 76 for engaging the cams as the followers are moved back and forth in engagement therewith. By providing all cams with their starting and finishing edges 77 substantially at the same height, the contact roller will move smoothly over them, producing a variation of the cam slot in a key, depending upon the variation of the other or intermediate surfaces of the cams.

In attaching the follower at the end of each beam 13 there is a recess 80 at the end of the beam in which a follower block 81 is seated having a lateral projection which forms the follower 75. The block is adjustable up and down in the recess by set screws 82 at the top and bottom of the beam and an end plate 83 attached over the face of the recess by fastening screws 84 has slots 85 therein through which extend fastening screws 86 threaded into holes 87 in the block. By the adjustment of these screws 82 and 86 the follower 75 is varied and held in any desired position.

Adjacent the end of each beam 13 is a bore 88 opening from the under side thereof and having a slidable follower 89 movable therein under the influence of a spring 90 at the bottom of the bore and held in place and limited in its movement therein by a cross pin 91 and a slot 92 in the follower through which it projects. In a slot or recess at the bottom of the follower is a roller 93 mounted upon a bearing pin 94 and projecting beyond the face of the follower to engage the surface of a contact plate 95.

This contact plate 95 has blocks 96 attached to the under sides thereof and inclined surfaces 97 at the front of each block. To the rear block are attached threaded rods 98 held in place by set screws 99 and the rods extend through vertical slots 100 in a plate 101 fixed to the end of the base 10. On each rod at one side of the plate are lock nuts 102 for limiting the end-wise movement of the plate in one direction and a lock nut 103 for limiting the endwise movement of the plate in the other direction.

Figure 3:
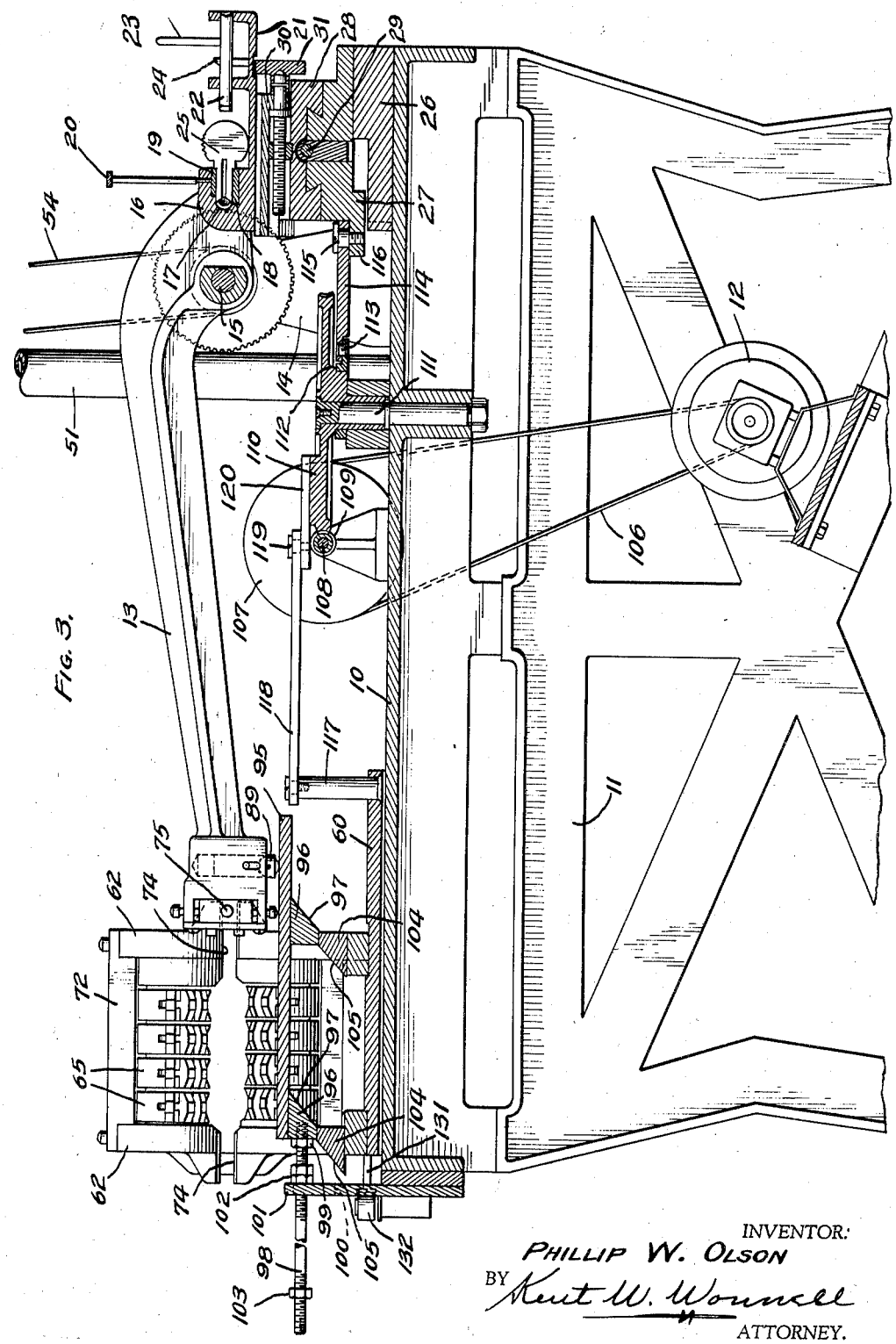
Fig. 3 is a side elevation with some of the parts shown in section.

Disposed below the contact plate 95 and secured to the slidable plate 60 are supporting blocks 104 each having a rearward inclined surface 105, the blocks and the inclined surfaces corresponding to the blocks 96 and the inclined surfaces 97 so that as the plate 60 is reciprocated, the rearward movement of the plate will cause the inclined surfaces of the blocks to engage, forcing the plate 95 upwardly to the position shown in Fig. 3, in its rearward direction of movement and causing the plate 95 to move downwardly on the inclined surfaces 97 and 105 when the plate 95 is limited in its forward movement by the engagement of the stop nuts 103 with the stop plate 100 as shown in Fig. 5 when the plates are moved forwardly.

In order to move the plates and the key cutting head in accordance with each other, the driving motor 12 is connected by a belt 106 with a pulley 107 at the top of the base, the pulley being mounted upon a shaft 108 which carries a worm gear 109 meshing with a worm wheel 110 mounted upon a vertical shaft 111 supported by the base. Mounted upon the hub of the gear wheel 110 is an eccentric 112 having a pivot 113 for connecting it to one end of a link 114, the other end of which is connected by a bearing screw 115 to a projection 116 at the end of the slide plate 27.

To actuate the cam supporting head and the slide plate 60 a post 117 is secured to the inner or front end of the plate and it is connected by a link 118 pivoted at one end to the post and at the other end by a pivot 119 at the end of an arm 120 secured to the gear wheel 110.

In operation the motor 12 drives the gear wheel 110 continuously in one direction and the key blank head is reciprocated by the eccentric 112 and the link 114 for the length of the key cut. At the same time the cam supporting head is reciprocated by the above connection with the plate 60.

The beams 13 at each side of a key are weighted so that the longer arm of each beam which extends into the cam supporting head tends to move downwardly by its weight so that in the forward direction of movement when the plate 95 is supported by the blocks 96 and 104 in elevated position as shown in Fig. 1, the contact rollers 93 will rest upon the plate 95 pressing the followers 75 against the cams in the upper holders. When the plate 95 reaches the end of its forward travel the stop nut 103 engages the stop plate 101 and the plate 95 is gradually lowered by the engagement of the inclined surfaces 105 and 97 until they assume the position with the plate 95 lowered as shown in Fig. 5. In this condition the roller 93 is raised from the plate as the cam followers 75 engage the lower sides of the recesses 74 and upon the return movement of the cam supporting head the cam followers will engage the lower series of cams in the supporting heads. Thus the cam followers engage the upper cam surfaces in one direction of movement of the cam supporting head and the lower cam surfaces in the other direction of movement.

At the other end of the beams 13, the cutter supporting spindles are moved in a reverse direction but in accordance with the movement of the separate followers 75 so that with two cutters, one on each side of a key blank, it is possible to cut four totally unrelated grooves, shoulders, or key operating cams by a single movement of the key blank, first in one direction and then in the other. These unrelated cam surfaces as 121, 122, 123 and 124 of a key as shown in Fig. 13, may be in grooves at opposite sides of the key or these surfaces may be cut at the edges of a key on opposite sides thereof, leaving a central web or groove and the sides of the keys between the edges may be provided with separate grooves of the same or different widths.

Each of the cams as shown for example in Figs. 8 to 11, is preferably provided with a central perforated projection 125 on the side opposite the cam surface adapted to fit in a groove 126 of each of the cam holders 65 so that a fastening screw 127 may be inserted therethrough for rapidly attaching and removing the cams from the holders.

With this construction it is possible to cut a great variety of keys in the same series or different series having certain cam characteristics in common and to vary these easily and quickly by changing the cams applied thereto when desired. Furthermore the cams are quickly and positively set and may be adjusted for varying the key cutting with the least possible delay.

Figure 2:
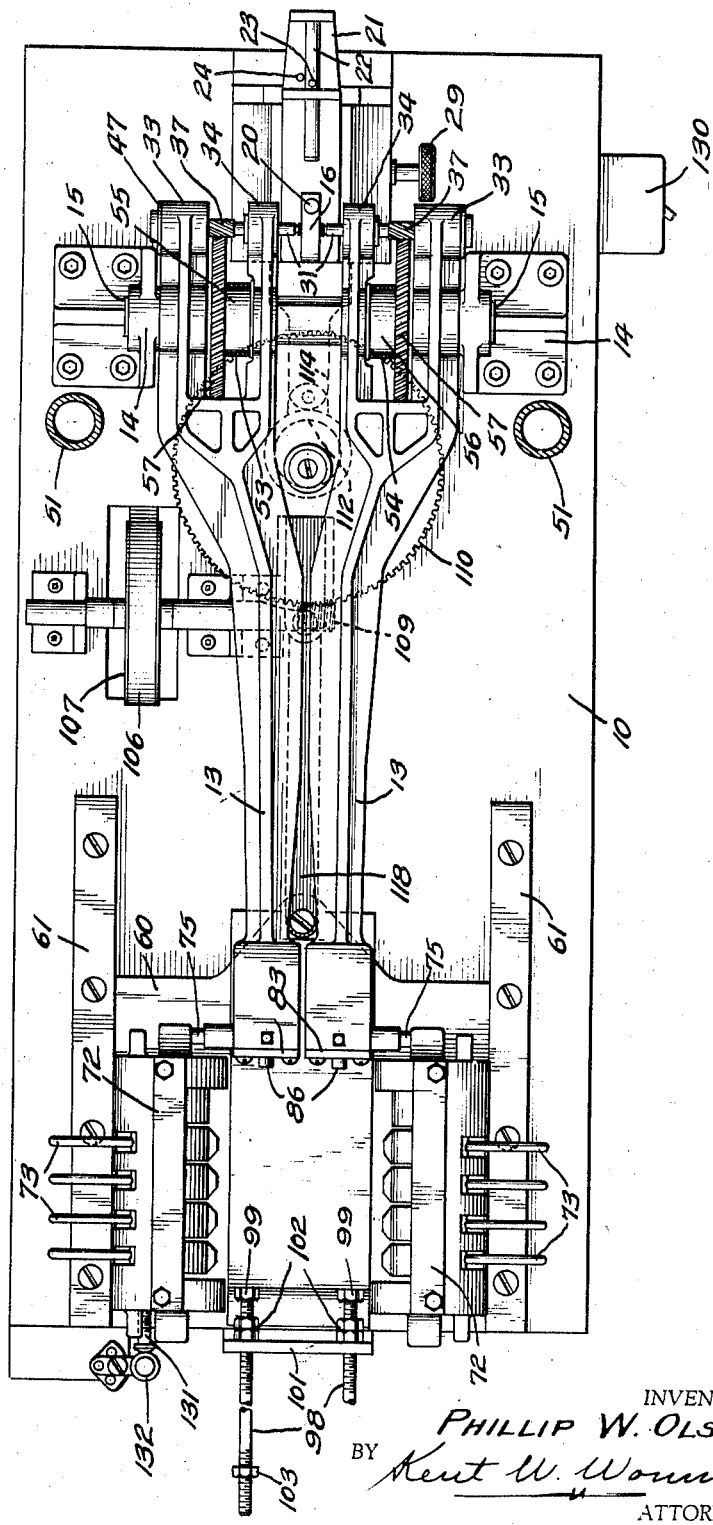
Fig. 2 is a top plan view with a portion of the cutter driving means omitted.

In operation the cutters are continuously operated by the cutter motor 50 and the motor 12 is operated to reciprocate the heads one complete operation, that is, a complete movement in both directions, or one complete rotation of the operating wheel 110 for each key. A key blank 25 is inserted for each complete operation by moving the clamping bar 22 to engage the key endwise, and by moving the upper clamping plate 19 by the screw 20 if necessary, an automatic cut-off is provided for stopping the motor 12 at the end of each operation, and a switch 130 is located adjacent the key holding head for again starting the motor 12. The automatic motor cut-off may comprise an adjustable stop member 131 projecting from the rear of the supporting plate 20 (see Fig. 2) adapted to engage a switch member 132 carried at the end of the base 10 and operative to make and break an energizing circuit to the motor 12. As soon as the cam supporting plate 60 is at the end of its stroke the projection 131 engages the switch 132 which is held normally in closed position by a spring 133 (see Fig. 12) and as soon as the projection of the plate is moved away from engagement with the switch member 132 the spring closes the circuit to the motor, which remains closed until the cycle of operations for cutting one key is completed.

Referring now more particularly to Fig. 12, the switch 130 as shown also in Fig. 1, is preferably of the double pawl variety and is held normally in open position by a spring 134. The switch 130 is first closed manually which starts the motor 12 and as soon as the motor is started the switch 132 is automatically closed whereupon the switch 130 may be released.

In tracing the circuits for the motor operation, a main switch 135 is operated to close connections from the supply mains 136 to conductors 137 and 138 leading to the motor 50 so that the cutter motor is continuously operated whenever the main switch is closed. Leading from the conductors 137 and 138 are conductors 139 and 140 from which an energizing circuit is closed to conductors 141 and 142 respectively through the switch 130. As soon as a starting circuit is established for the motor 12 the switch 132 is automatically closed by its spring 133 thereby completing a circuit between conductors 143 and 144 which lead from the conductor 140 to the motor conductor 142, and a conductor 145 forms a permanent connection between the other conductor 139 and the motor conductor 141. Thus a holding circuit for continuing the operation of the motor 12 is established by momentarily closing the switch 130 and holding it closed until the switch 132 is closed automatically for another cycle of operations.

Thus it is apparent that a great variety of keys can be cut quickly and simply; the cuts can be varied in a simple manner; from one to four cuts of any desired outline may be cut on any key blank; the cuts may form similar or unrelated shoulders at the sides of center grooves on opposite sides of the key, or at the edges thereof; the length of cuts may be varied by simply varying the driving connections; the depths and sizes of the cuts are easily varied by a variation of the bits or cutters 39, and various other changes and adjustments may be made without departing from the spirit and scope of the invention.

I claim:

1. In a key cutting machine for flat key blanks, cutters at opposite sides of a key blank to engage opposite sides of a key at the same time, means to move a key and to vary the cut made by each cutter at opposite sides of a key as the cuts are made simultaneously.

2. In a key cutting machine, cutters at opposite side faces of a key blank to simultaneously engage opposite sides of the key, means to move a key longitudinally, and means to move each cutter independently to vary the cut at each side and to make a cut in both side faces as the key is moved.

3. In a key cutting machine, rotary cutters at opposite sides of a key blank to engage opposite sides of a key, means for moving a key longitudinally, and means to move the cutters at opposite sides independently to cut both sides of a key as the key is moved.

4. In a key cutting machine, a rotary cutter at each side of a key for engaging both opposite side faces simultaneously, means for moving the key longitudinally, and means for moving the cutters transversely to the movement of the key for varying the cut at each side of the key as the cuts in both side faces are made at the same time.

5. In a key cutting machine, means for moving a flat key blank longitudinally, cutters on opposite sides of the blank movable in independent paths for making different cuts on both of the sides of the key as it is moved in opposite directions, the cuts on opposite sides of the blank being made simultaneously.

6. In a key cutting machine, means for adjustably mounting a key for reciprocating endwise movement, a pair of rotating cutters to engage opposite sides of the key at the same time, and means for moving each cutter independently to form unrelated cuts simultaneously in the opposite sides of the key which are variable in opposite directions of movements of the key.

7. The method of simultaneously cutting two unrelated tumbler operating cam surfaces at each side of a key which consists in moving the key longitudinally in opposite directions and simultaneously cutting a cam surface at each side thereof in one path when the key is moved in one direction and in cutting another cam surface on each side in a different unrelated path when the key is moved in the other direction.

8. In a key cutter, means for adjusting the position and longitudinally moving a key in opposite directions, a pair of rotary cutters, one at each side of the edge of the key, a single motor for operating both cutters, and means for independently moving the cutters in different paths, depending upon the direction of movement of the key.

9. In a key cutter, means for reciprocating a key blank in opposite directions, a rotary cutter to engage each side face at the edge of the key blank, a motor for rotating both of the cutters in opposite directions, and means for rocking the cutters independently to vary the cuts at the sides of a key, depending upon the direction of movement of the key blank.

10. In a key cutting machine, a key holder movable reciprocably, a pair of cutters, one at each side of the edge of a key to be cut, movable transversely of the path of the key, and means for controlling and varying the path of each cutter in each direction for making a plurality of independent, unrelated tumbler operating surfaces at opposite sides of a key.

11. In a key cutting machine, a reciprocable key holder, a pair of key cutters to engage opposite sides at the same edge of a key, one at each side of the holder, means for mounting each cutter to move transversely of the path of the key holder, and a single driving means for both of the cutters.

12. In a key cutting machine, a reciprocable key holder, a cutter therefor at each side of the holder to engage one side at the edge of the key, a common motor for driving the cutters, and a pair of mounting members, one for each cutter, mounted on a common axis but independently movable for varying the cutting on each side of a key.

13. In a key cutting machine, a key holding head comprising an adjustable clamp having upper and lower plates for engaging opposite edge portions of a key to hold it against turning, and means including a longitudinally movable clamping bar for engaging the end of the key to quickly secure it endwise in the clamp.

14. In a key cutting machine, a key holder having an adjustable support and means for moving the holder in opposite directions, a key clamp movable for engaging the end of a key endwise in the holder exposing the sides and cutters for simultaneously engaging the sides of a key as it is moved in opposite directions.

15. In a key cutting machine, a key holder, a cutter at each side of the holder, a separate beam for mounting each cutter one at each side of a key blank to be cut, the beams having a common pivot at a distance from the cutter mounting, and a common drive for the cutters for communicating movement thereto about the axis of the said beams.

16. In a key cutting machine, a reciprocating key holding head, a cutter at each side of the head disposed to engage the side face of a key blank, a beam for mounting each cutter to move across the path of the head, and means for separately engaging each beam for independently varying the movement of its cutter.

17. In a key cutting machine, a key holder movable in opposite directions, a cutter at each side of the holder disposed to engage the side face of a key in said holder, a beam for each cutter, means for mounting the beams to move the cutters transversely of the path of movement of the holder, and adjustable means for engaging the beam to move the cutters in unrelated paths as the key holder is moved in opposite directions.

18. In a key cutting machine, a key holding head and a cam holding head movable reciprocably, a rotary cutter for engaging a key in the holding head, a member for mounting the cutter to move transversely of the path of movement of the cutter head and having an extension for engagement by the cam holding head to vary the movement of the cutter as the heads are moved in opposite directions.

19. In a key cutting machine, a key holding head and a cam holding head, a cutter at each side of the key holding head for engaging the side face of a key in said head, a supporting member for each cutter mounted upon an axis intermediate its ends, the other end of each member being engaged by the cam holding head for varying the movement of the cutter as the key holding head is moved in opposite directions.

20. In a key cutter, a key holding head and a cam holding head both reciprocable, a pair of cutters, one at each side of the cam holding head, a pair of separate cutter holding members having a common axis intermediate their ends, a mounting at one end for the corresponding cutter, and the other end of each member being engaged in the cam holding head for rocking the members as the heads are reciprocated.

21. In a key cutting machine, a key holding head and a cam holding head, and means to reciprocate them, a cutter at each side of the first head, a member pivoted intermediate its ends at each side of the key holding head in which one of the cutters is mounted, the other end of the member extending into the cam holding head, and a plurality of cams for engaging the member to vary the movement of the cutter at the other end thereof.

22. In a key cutting machine, a pair of members pivoted intermediate their ends having cutters extending inwardly at adjacent ends for engaging opposite sides of a key, and a movable cam holding head at the other ends of the members having upper and lower sets of cams for engaging the ends of the members and guiding them differently when the cam holding head is moved in opposite directions.

23. In a key cutting machine having a pair of key cutter members mounted intermediate their ends, a cam holder into which the ends of the members extend, adjustable upper and lower series of cam holders and means for moving the head so that each member engages an upper series of cams in one direction of movement of the cam holder and a lower series of cams in the other direction.

24. In a key cutting machine, a pair of beams pivoted intermediate their ends, inwardly projecting cutters at adjacent ends of the beams, a movable cam holder head at the other ends of the beams, said head having an upper and a lower series of cam holders with a plurality of cams on each holder for variously engaging the ends of the beams when the head is moved in opposite directions.

25. In a key cutting machine, a pair of pivoted beams in which cutters for simultaneously engaging opposite sides of a key are mounted at adjacent ends, a cam holder head into which the other ends of the beams project, said head comprising an upper and lower series of cam holders for each of the beams, a plurality of cams in each of the holders, means for setting and holding the cams of each holder in any desired variation thereof, and means for engaging the ends of the beams with the upper and lower selected series of cams.

26. In a key cutting machine, a key cutter, a member pivoted intermediate its ends having a cutter mounted at one end, a cam holding head into which the other end of the member projects, a plurality of cam holders each having a plurality of cams mounted therein, means for adjusting and retaining the holders with selected cams in alignment to engage the extremity of said member for varying the movement of the cutter as the cam head is moved.

27. In a key cutting machine comprising key cutters, a pair of members in which the cutters are mounted at one end, a movable cam head into which the other ends of the members project, a plurality of cam holders and a plurality of cams in each holder, the holders being adjustable to bring different cams into alignment for engagement by the members, and the cams having various cam surfaces but the adjacent edges thereof being of the same height to produce a smooth engagement of the members between adjacent cams.

28. In a key cutting machine, a movable cam holding head for engaging the ends of pivoted key cutter supports, the head having a plurality of holders and a plurality of cams for each holder, the cams having various intermediate surfaces but the edges of all of the cams being of the same height.

29. In a key cutting machine, a key cutter, a member for supporting the cutter, a cam holding head into which one end of the member projects, a plurality of cam holders mounted in upper and lower series in the head, and means including a plate movable with the head for pressing the end of the member into engagement with the upper series of cams in one direction of movement of the head.

30. In a key cutting machine, a key cutter, a supporting member for the key cutter, a movable cam holding head having a plurality of cam holders mounted in upper and lower sets for engaging the said member, a plate mounted for movement with the head having means for raising and lowering it in accordance with the direction of movement of the head, the said member engaging one series of cams in the holders when the head is moved in one direction and being engaged by the plate to engage the other series of cams in the holders when the head is moved in the other direction.

31. In a key cutting machine, a key cutter, a pivoted member for mounting the key cutter at one end, a reversely movable cam holding head into which the other end of the member projects, the head comprising a plurality of cam holders arranged in upper and lower series for aligning cams at the bottom and top respectively of a longitudinal space between them, the member having a projection into said space and moved by gravity against the lower series of cams in one direction of movement of the head and means for engaging the said extremity for moving it against the upper series of cams in the other direction of movement of the head.

32. In a key cutting machine, a cutter and a movable member for supporting the cutter, a reversely movable cam supporting head having a plurality of series of cams for engaging the member in opposite directions of movement, means including a plate movable with the cam head, and a spring pressure contact member carried by the member and engaged by the plate for pressing the member into engagement with one series of cams and means for changing the plate from one elevation to the other in the cam head depending upon the direction of movement thereof.

33. In a key cutting machine, a pair of cutters for engaging opposite sides of a key, a pair of pivoted members in which the cutters are mounted, a reversely movable cam holding head into which the members project, the head having upper and lower series of adjustable cams, two at each side, for the corresponding member, the upper and lower series of cams being spaced apart and the cam head having a recess forming a continuation of this space at the ends of the head, each member having a projection to extend into the recesses and between the cams, the projection engaging by gravity with the cams and sides of the recesses in one direction of movement of the head, and means for pressing the member so that its projection engages the opposite sides of the recesses and the cams in the other direction of movement of the head.

34. In a key cutting machine, a movable key holding head and a movable cam holding head, a key cutter at the side of the key holding head, a pivoted member having the key cutter mounted at one end and the other end extending to the cam holding head, means in the cam holding head for engaging the member to move the cutter in accordance with the direction of movement of the said head, a driving motor and means operated by the motor for moving the heads at the same time and varying the cut in accordance with the cam engagements of the cam holding head.

35. In a key cutting machine, a movable key holding head and a movable cam holding head, a continuously movable cutter, a member for mounting the cutter at one side of the key holding head and extending to the cam holding head, means on the cam holding head for moving the member and the cutter in accordance with the movement of the said head, means including a motor for driving the said heads, and means for stopping the motor when both heads have been moved a complete cycle.

36. In a key cutting machine, a key holding head and a cam holding head, both movable in opposite directions, a pair of cutters, one at each side of the key holding head, a pair of arms in which the cutters are separately mounted extending to the cam holding head, a single motor for continuously driving both of the cutters, means in connection with the cam head for engaging the supporting members to vary the movement of the cutters in accordance with the movement of the heads, and separate drive means for operating the heads a full movement in each direction for each complete key cutting operation.

37. In a key cutting machine, a movable cutter head and a movable cam head, a key cutter, a pivoted member for mounting the cutter adjacent the first head and projecting for operation by the second head, a motor for continuously driving the cutter, a separate motor for moving the heads in opposite directions, and means for controlling the motors comprising a main switch for continuously operating the cutter motor, a spring contact switch for momentarily closing an energizing circuit to the other motor, and a sustaining circuit including a contact switch for closing a circuit to the said other motor until a cycle of operations thereof is complete.

38. In a key cutting machine, a key holding head and a cam holding head both movable in opposite directions, a key cutter and means for driving it continuously, a member for mounting the cutter at the side of the key holding head and projecting to the cam holding head for engagement thereby, a motor for driving the said heads and a control for the motor comprising a manual switch which must be held to close a starting circuit for the motor, a stop carried by one of the heads and a spring pressed switch engaged by the stop at the end of its movement to open the switch, and a sustaining circuit for the motor which is closed by this last named switch and opened automatically to stop the motor as soon as the head is returned to engage the stop with the switch.

PHILLIP W. OLSON.